United States Patent
de Raddo

(10) Patent No.: US 8,347,903 B2
(45) Date of Patent: Jan. 8, 2013

(54) COLANDER/BOWL SET

(76) Inventor: Virginia de Raddo, San Jose, CA (US)

( * ) Notice: Subject to any disclaimer, the term of this patent is extended or adjusted under 35 U.S.C. 154(b) by 0 days.

(21) Appl. No.: 13/295,144

(22) Filed: Nov. 14, 2011

(65) Prior Publication Data

US 2012/0055515 A1   Mar. 8, 2012

Related U.S. Application Data

(63) Continuation-in-part of application No. 12/391,313, filed on Feb. 24, 2009, now abandoned.

(60) Provisional application No. 61/032,117, filed on Feb. 28, 2008, provisional application No. 61/434,973, filed on Jan. 21, 2011.

(51) Int. Cl.
*B08B 3/00* (2006.01)
*B01D 35/28* (2006.01)

(52) U.S. Cl. .............. 134/201; 210/469; 220/573.4; 220/751; 220/756; 220/761; 220/769; 220/770; 220/912

(58) Field of Classification Search ............. 220/429, 220/573.4; D7/667
See application file for complete search history.

(56) References Cited

U.S. PATENT DOCUMENTS

| | | | |
|---|---|---|---|
| 1,688,846 A | 10/1928 | Andrews | |
| 1,963,294 A * | 6/1934 | Davis | 99/403 |
| 2,663,428 A | 12/1953 | Hoagland | |
| 3,300,048 A | 1/1967 | Samuel | |
| 4,220,534 A | 9/1980 | Perry | |
| 5,210,769 A | 5/1993 | Seidel et al. | |
| 5,562,025 A | 10/1996 | Bull et al. | |
| 5,853,581 A | 12/1998 | Rayborn et al. | |
| 5,931,333 A | 8/1999 | Woodnorth et al. | |
| 5,988,050 A | 11/1999 | Foster, Jr. | |
| D425,378 S | 5/2000 | Gilbertson | |
| 6,126,018 A | 10/2000 | Cone et al. | |
| 6,159,513 A | 12/2000 | Judlowe et al. | |
| 6,949,190 B2 | 9/2005 | Hutzler | |
| 7,422,120 B1 | 9/2008 | Fried | |
| 7,537,130 B2 | 5/2009 | Lee et al. | |
| 2006/0131349 A1* | 6/2006 | Kaas | 222/566 |
| 2007/0029332 A1* | 2/2007 | Hartjes et al. | 220/592.2 |
| 2007/0090103 A1* | 4/2007 | France et al. | 219/400 |
| 2008/0134776 A1 | 6/2008 | Zhou et al. | |

FOREIGN PATENT DOCUMENTS

| | | |
|---|---|---|
| GB | 1064223 | 4/1967 |
| JP | 2000152885 | 6/2000 |
| KR | 20030003169 | 1/2003 |

OTHER PUBLICATIONS

Abstract of JP2000152885, Jun. 2000.
Abstract of KR20030003169, Jan. 2003.

* cited by examiner

*Primary Examiner* — Michael Kornakov
*Assistant Examiner* — Nicole Blan
(74) *Attorney, Agent, or Firm* — Cahn & Samuels, LLP

(57) ABSTRACT

A colander/bowl set includes a bowl having at least one indicator; and a colander comprising a plurality of holes, the colander being insertable into the bowl and removably attachable to the bowl. The at least one indicator is a calibrated guide positioned at a height of a maximum amount of water which the colander/bowl set holds, accounting for displacement of water by the colander and by a particular kind of food.

11 Claims, 6 Drawing Sheets

COLANDER/BOWL SET

This patent application is a continuation-in-part of U.S. Ser. No. 12/391,313 filed on Feb. 24, 2009, now abandoned, which claims priority to U.S. Ser. No. 61/032,117 filed on Feb. 28, 2008, the entireties of which are incorporated herein by reference. The patent application also claims priority to U.S. Ser. No. 61/434,973 filed on Jan. 21, 2011, the entirety of which is incorporated herein by reference.

FIELD OF INVENTION

The present invention is directed to a colander/bowl set for at least one of washing, draining or soaking a food, such as fruits, vegetables, rice, pasta, beans, legumes, nuts, or seeds.

BACKGROUND OF THE INVENTION

Water is one of Earth's most critical and valuable natural resources. Water is the basis of life itself; our quality of life depends on its existence. Water moves through our environment in a process known as the Water Cycle. It is called a cycle because the flow is continuous. The sun and gravity contribute to the cycle. As the sun evaporates water from the Earth's rich water reserves, such as the oceans, lakes, streams and even soil, the evaporated moisture builds up in the atmosphere as clouds. Along with this evaporated water, there is transpired moisture as well. People, plants and animals transpire water into the air. Like evaporated water, transpired moisture collects in the atmosphere as clouds. Eventually these clouds release their precipitation in the form of rain, snow, hail and sleet. When the precipitation reaches Earth, water returns to the oceans, lakes, streams and soil—the cycle starts all over again.

Water is a precious commodity; it is a limited resource that is continually being depleted as the population of Earth continues to grow at an unprecedented rate. In addition, the growth of industry in the world has created a landscape where water is polluted beyond the point where it can be treated for human consumption. The Environmental Protection Agency (EPA) states that only one percent of the water on Earth is available for human use.

Only Earth, within our galaxy, is known to have water. If water becomes so scarce as to reach a point where people can't be adequately hydrated, there is no other known place to seek it. It is essential that we not only preserve water, but use it efficiently.

The colander/bowl set according to the present invention makes conserving water quick, easy, and efficient. My invention proves that conservation doesn't have to mean sacrifice.

There is no simple home device on the market that is as energy efficient in washing foods such as produce and rice; draining pasta and rice; or soaking beans, rice, legumes, nuts, and seeds as the colander/bowl set. The colander/bowl set is simple to store in kitchen cupboards and because it comes in different sizes, there is one to suit everyone's needs. The colander and bowl nest together for easy space saving storage. In addition, the bowl can be used separately as a preparation, mixing, or serving bowl.

SUMMARY OF THE INVENTION

It is an object of at least one embodiment of the present invention to provide a colander/bowl set for conserving water in the kitchen or home.

Another object of at least one embodiment of the present invention is to provide at least one indicator on at least one of the bowl or colander that facilitates water conservation by comprising a calibrated guide positioned at a height of a maximum amount of water the colander/bowl set holds for a particular food to prevent water from spilling over a rim of the bowl.

Still another object of at least one embodiment of the present invention is to provide for locking or removably attaching the colander to the bowl so that neither the colander nor the bowl will move about as food is washed inside the colander.

An advantage of at least one embodiment of the present invention is that the colander/bowl set provides an easy-to-use integrated kitchen utensil in which the bowl may be separately used as a preparation, mixing, or serving bowl.

Another advantage of at least one embodiment of the present invention is that water collected in the colander/bowl set may be reused, for example, for washing additional produce, for rinsing recyclables, or for watering garden and household plants.

The above objects and advantages are satisfied by a colander/bowl set for washing foods such as produce and rice; draining pasta and rice; or soaking beans, rice, legumes, nuts, or seeds. The colander/bowl set in at least one embodiment comprises a bowl and a colander comprising a plurality of holes. At least one indicator on at least one of the bowl or colander comprises a calibrated guide positioned at a height of the maximum amount of water which the colander/bowl set holds for a particular food, before spillage of water occurs.

Given the following enabling description of the drawings, the apparatus and methods should become evident to a person of ordinary skill in the art.

BRIEF DESCRIPTION OF THE DRAWINGS

FIG. 5b is a perspective view of FIG. 5a.

DETAILED DESCRIPTION OF THE INVENTION

In this detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated. Thus, the invention can include any variety of combinations and/or integrations of the embodiments described herein.

FIGS. 1-8 illustrate a colander/bowl set according to the present invention. The colander/bowl set is designed to be an effective water-saving device and, equally importantly, provides a water-saving method for thoroughly washing, cleaning, draining, or soaking a number of foods.

Figure 1:
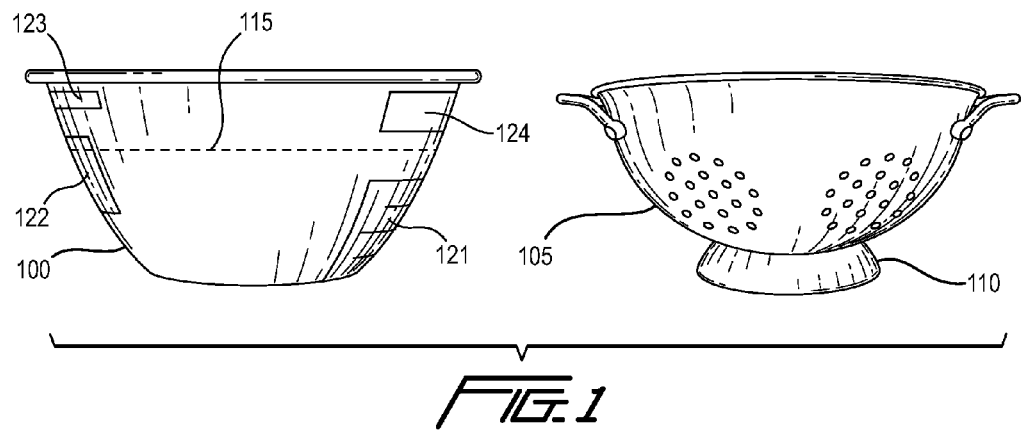
FIG. 1 illustrates a bowl and colander side-by-side according to an embodiment of the present invention.
Figure 2:
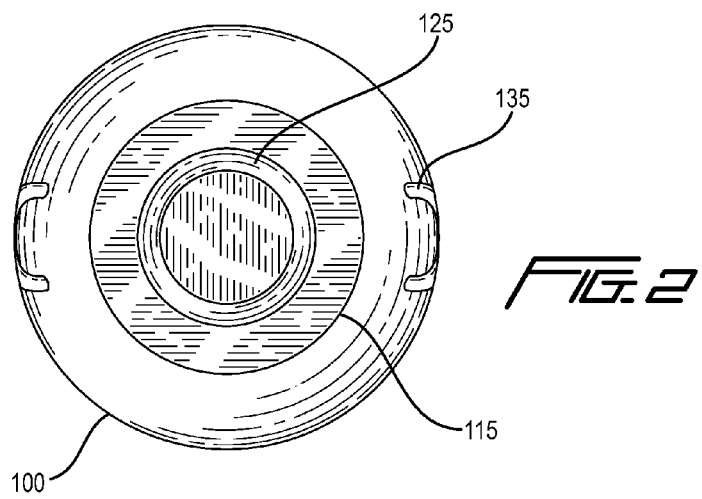
FIG. 2 is a top view of the bowl of FIG. 1.

As illustrated in FIGS. 1-2, the colander/bowl set comprises a bowl 100 and a colander 105 comprising a plurality of holes or perforations. In a specific embodiment, the colander may have a pedestal 110 (FIG. 1), for example a quarter-inch, a half-inch, or inch pedestal, so that it can stand in a sink, if so desired, thereby allowing excess water to drain from it. The pedestal may be shorter than other colanders, and as such, colander 105 may nest snugly in bowl 100, is insertable into the bowl, and is removably attachable to the bowl.

The colander/bowl set may come in different sizes. For example, a small colander/bowl set may comprise 4 qt. bowl and a 3 qt. colander, with the set having a 2 qt. water capacity. A larger colander/bowl set may comprise a 6 qt. bowl and a 5 qt. colander, with the set having a 4 qt. water capacity. The colander and bowl may be made out of wood, plastic, stainless steel, or any suitable material. In a specific embodiment, the colander and/or bowl may be made from Eastman TRITAN™ copolyester or another bisphenol-A (BPA) free, dishwasher-durable, heat and chemical resistant plastic material.

As illustrated in FIGS. 1-2, the bowl 100 may comprise at least one indicator 115. The at least one indicator 115 may include, but is not limited to, at least one of a groove, channel, indentation, protrusion, rib, line, or any combination thereof. The at least on indicator may be located inside and/or outside of the bowl and may be located between a bottom of the bowl and a top of the bowl. In a specific embodiment, the at least one indicator may be a line around an interior diameter of the bowl.

The at least one indicator 115 serves as a guide for the maximum amount of water to which the bowl can be filled, before placing food in the colander/bowl set, to prevent spillage of water occurring from the colander/bowl set. According to the present invention, the at least one indicator is calibrated so that when food is added to the colander/bowl set there will be no spillage of water.

For example, the at least one indicator may be calibrated as a guide for the maximum amount of water to which the bowl can be filled, accounting for both the displacement of water by the colander and by a particular kind and/or amount of food (e.g., 3 potatoes). Accordingly, the at least one indicator may also serve as a guide for food having less water displacement than that used for calibration. In other embodiments, the bowl may have two or more calibrated indicators for different types of food. For example, a first calibrated indicator may be for potatoes, a second calibrated indicator may be for apples, and a third calibrated indicator may be for beans or lentils. Other calibrated indicators, such as for rice and/or pasta, are possible. In specific embodiments, the particular kind and/or amount of food corresponding to the calibrated guide may be printed, engraved, stamped, or embossed on at least one of the bowl or colander.

Figure 3:
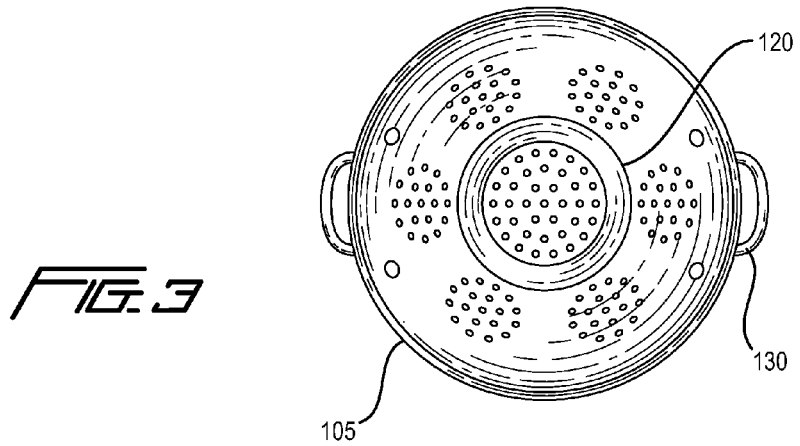
FIG. 3 is a top view of the colander of FIG. 1.

As illustrated in FIG. 3, the colander may have a similar at least one indicator 120 in addition to, or in place of, the at least one indicator 115 on the bowl.

The bowl 100 may have at least one marker 121 to show the amount of water that has been poured into the bowl. The at least one marker 121 may be located beneath the at least one indicator 115. For example, the at least one marker may include three markers showing that one cup, two cups, or three cups of water have been poured into the bowl. In a specific embodiment, the at least one marker 121 may be about an inch to distinguish them from the at least one indicator 115. In certain embodiments, the at least one marker may be visible in a clear window from the outside of the bowl. After continued use of the bowl with at least one marker 121, people will know how much water is needed to fill the bowl for a certain amount of food to be cleaned. In certain embodiments, a large bowl may have four short markers in additional to the at least one indicator; whereas, a smaller bowl may have two short markers in addition to the at least one indicator.

In a specific embodiment, the bowl 100 may comprise a water-measuring gauge 122, for example a pressure sensor, flow meter, or float, electrically connected to a digital readout 123 informing a person of how much water has been used in over a predetermined interval (e.g., an hour, a day, a week, a month), thereby allowing the user to be conscious of the quantity of water used and saved. In another embodiment, the water-measuring gauge 122 may be electrically connected to an alarm 124 that visually or audibly indicates when water reaches the at least one marker 121 and/or the at least one indicator 115, thereby preventing overfilling or spillage due to inattention by a person using the colander/bowl set.

Figure 4:
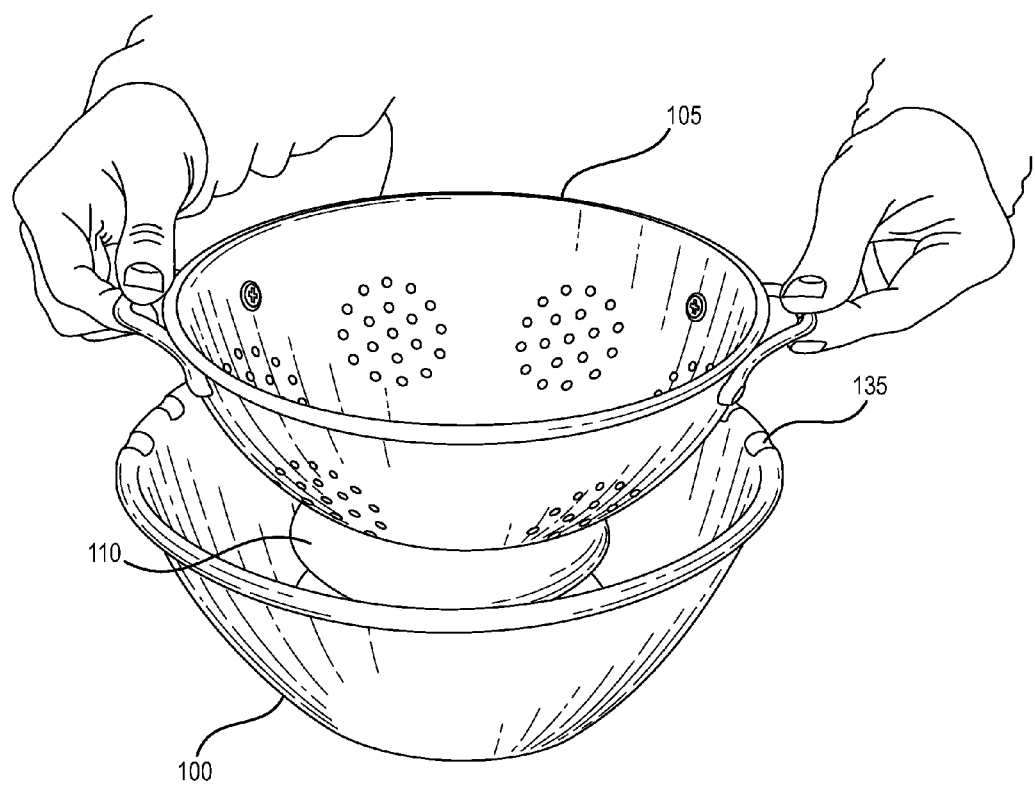
FIG. 4 illustrates a view of a colander being placed into the bowl according to an embodiment of the present invention.

The colander 105 is insertable into and may be removably attachable to the bowl 100, as shown in FIG. 4. As illustrated and discussed below, the colander 105 may be "locked" into the bowl 100 in at least one of: (1) at the rim of the bowl, or (2) at the bottom of the bowl.

As illustrated in FIG. 2, an inside bottom of the bowl 100 may have a circular circumference 125 that matches and engages a colander pedestal 110 base circumference, for example, in a snap-fit, screw, or other interlocking configuration. The circular circumference may include, but is not limited to, a raised lip or indented trough.

Figure 6:
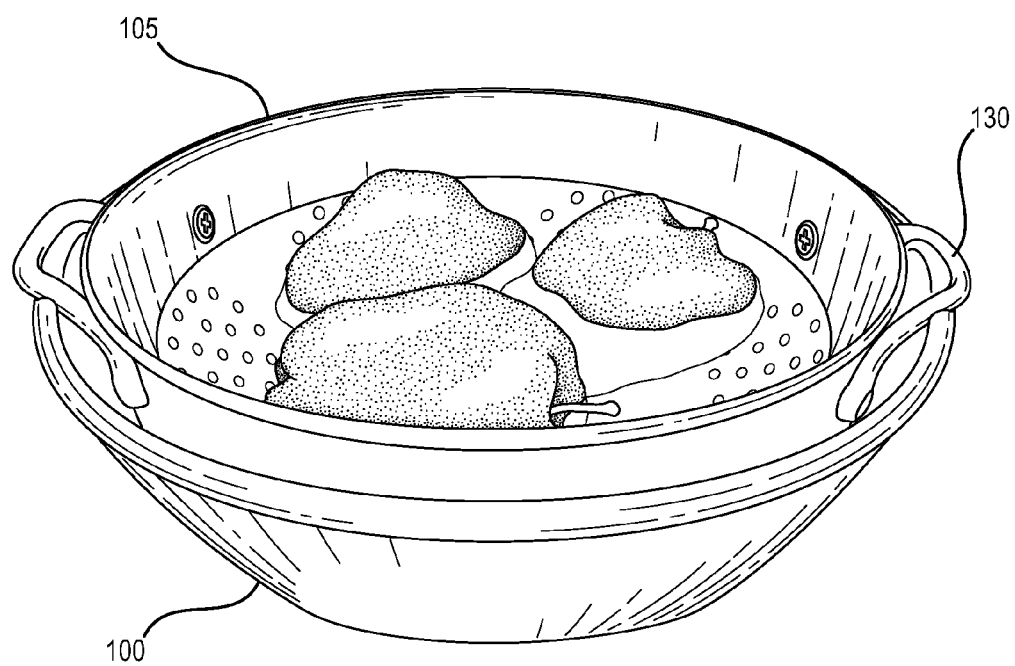
FIG. 6 illustrates the bowl and colander set when washing produce.

As illustrated in FIG. 3, the colander 105 may have handles 130 so that transferring the colander to a kitchen counter, a cutting board, or an oven area will be effortless. The handles 130 of the colander may be placed into grooves 135 in a top rim of the bowl, as illustrated in FIG. 2, FIG. 4 and FIGS. 5a-5b. Accordingly, neither the colander, nor the bowl, will move about as food is being washed inside the colander (FIG. 6).

Figure 5A:
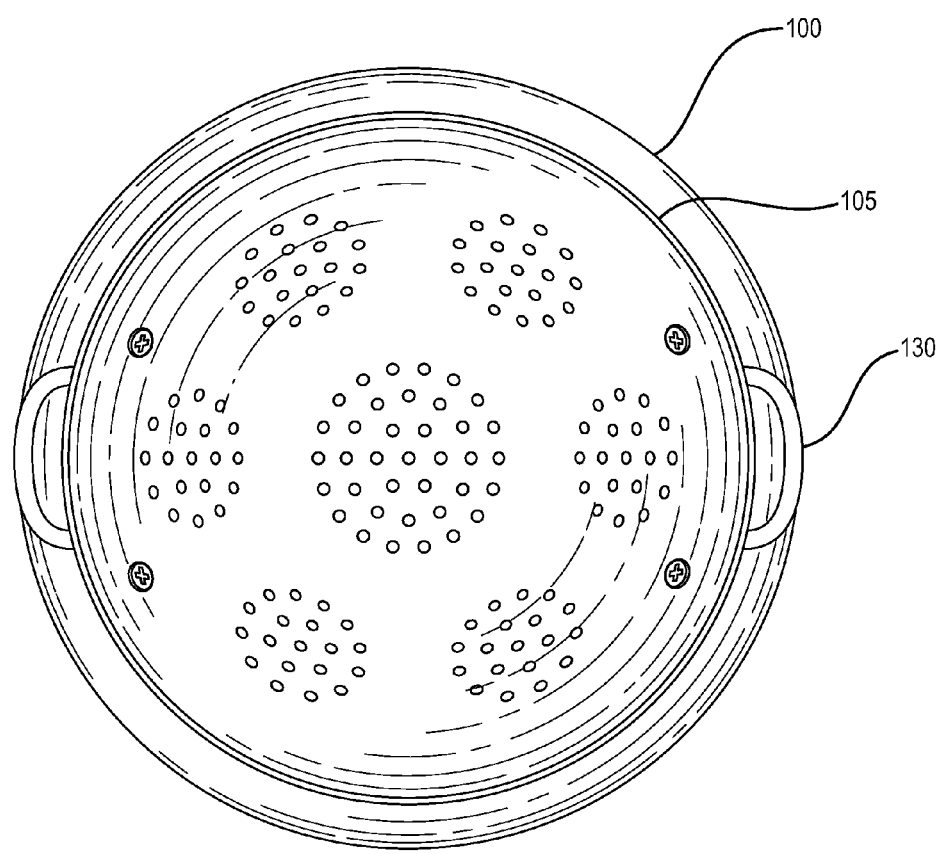
FIG. 5a illustrates a top view of locking the colander in place in the bowl according to an embodiment of the present invention.
Figure 5B:
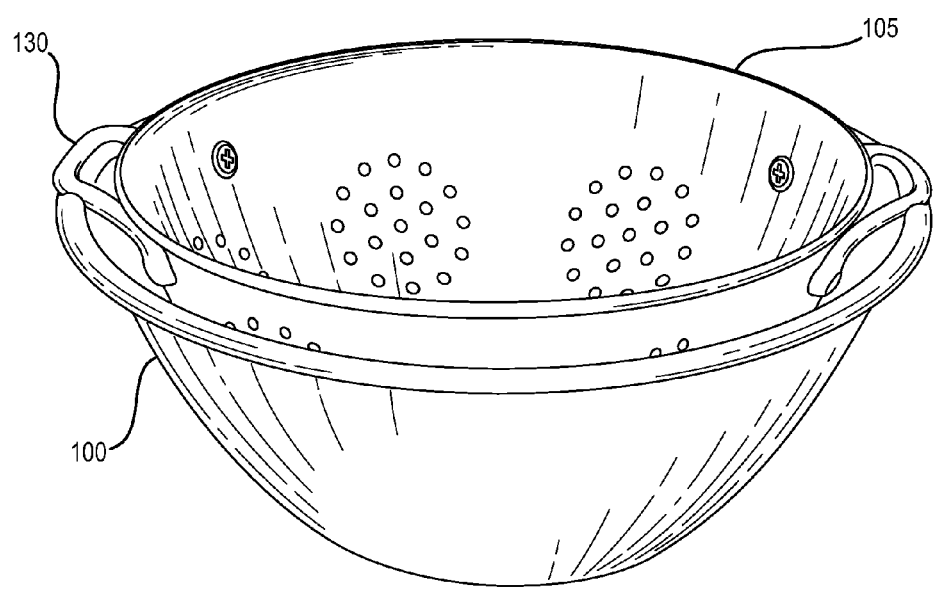
Figure 5C:
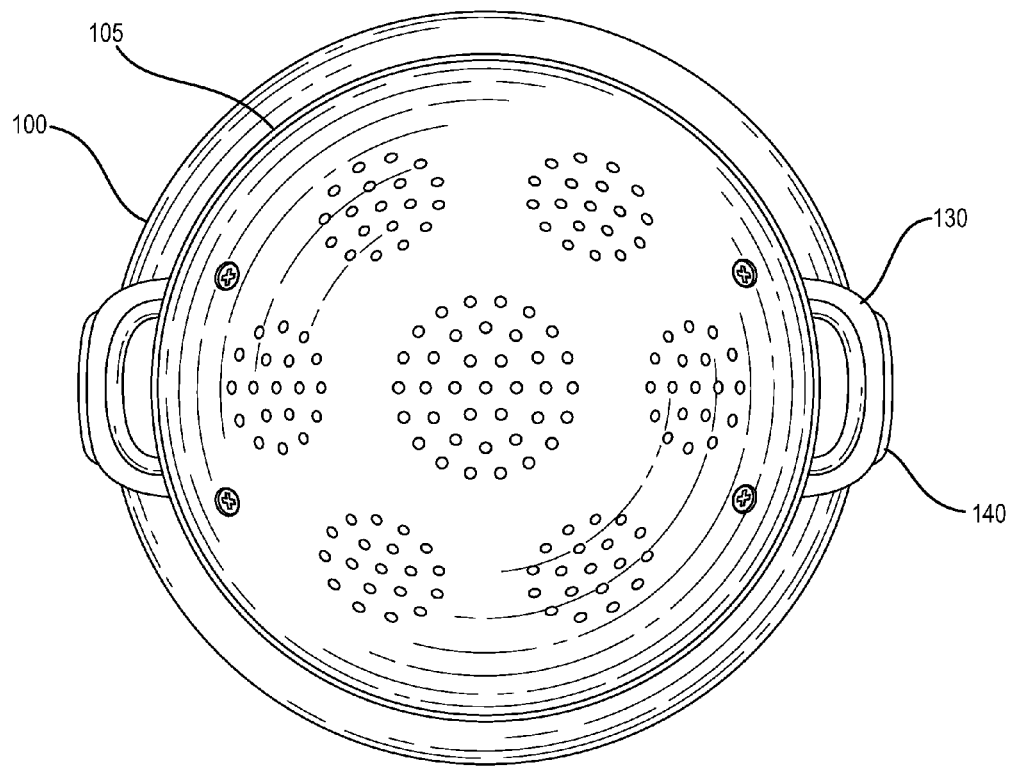
FIG. 5c illustrates a top view of locking the colander in place in the bowl according to another embodiment of the present invention.
Figure 5D:
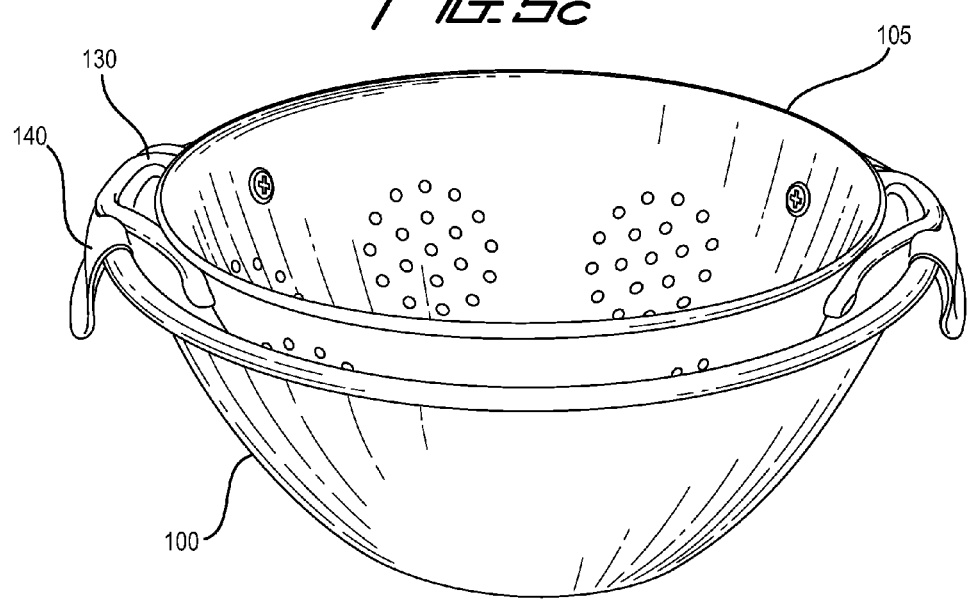
FIG. 5d is a perspective view of the bowl and colander set of FIG. 5c.
Figure 7:
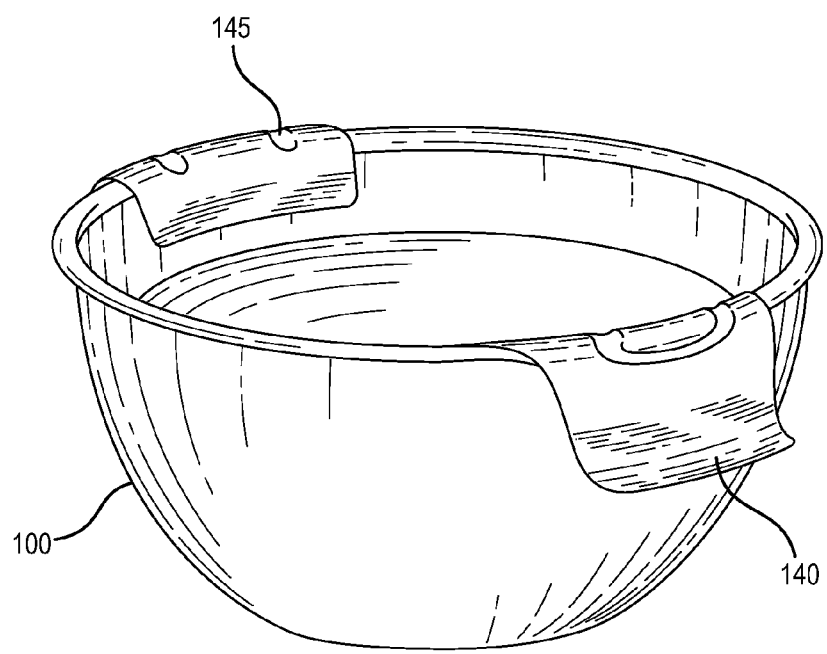
FIG. 7 illustrates the bowl of FIG. 6 without a colander.

In another embodiment, the bowl 100 may have a smooth inside bottom. Instead of grooves on a top rim, the bowl may have handles 140 with grooves 145 as illustrated in FIGS. 5c-5d and FIG. 7. Handles 130 of the colander 105 may be placed in grooves 145 in the handles 140 of the bowl 100 and thus removably attached (e.g., removed by the reverse action—lifting the colander up and away from the bowl).

Figure 8:
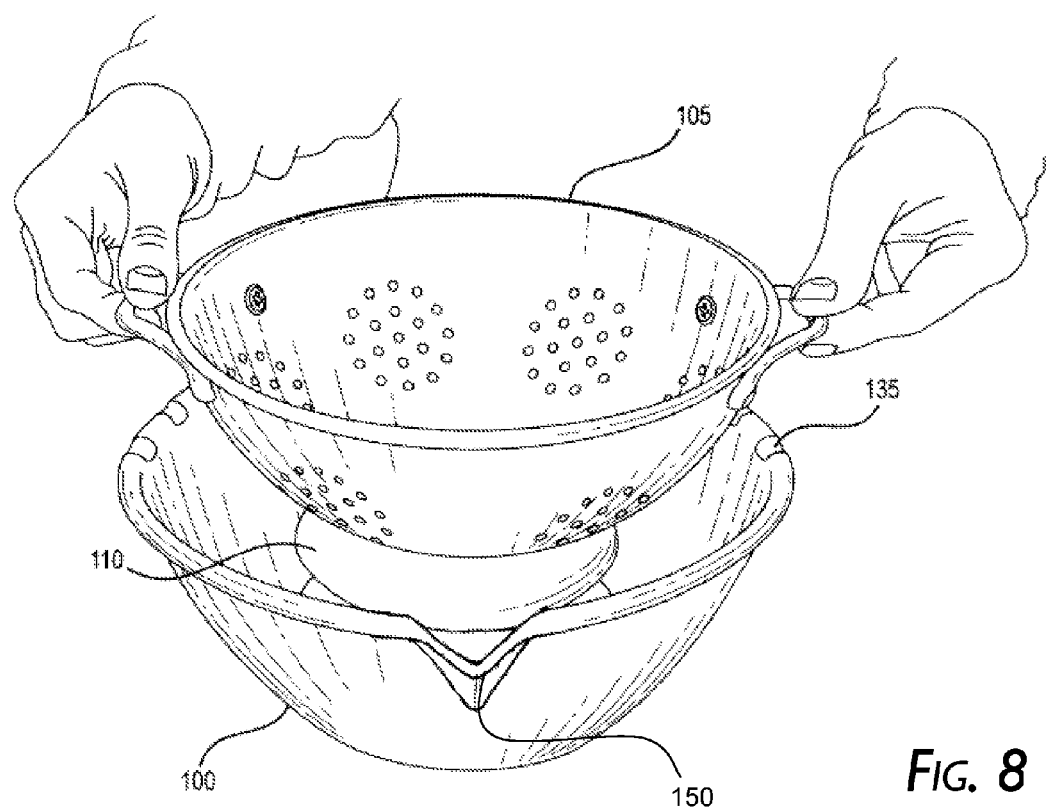
FIG. 8 illustrates another bowl and colander embodiment of the present invention.

As illustrated in FIG. 8, the bowl 100 may include a spout or pouring lip 150 for use in pouring water from the bowl 100.

Using the colander/bowl set is simple. First, the appropriate size colander/bowl set is chosen corresponding to the amount and type of food to be washed, cleaned or soaked. Second, the bowl may be filled with water, for example, up to the at least one marker and/or the at least one indicator. Third, the colander is placed within the bowl. Alternatively, the colander may be placed in the bowl and then the bowl may be filled with water up to the at least one marker and/or at least on indicator. Food may be cleaned and washed inside the colander.

Washing food in the colander/bowl set of the present invention is not only the best way to thoroughly clean food; it also saves the most water in doing so as well. Taking washing produce as an example, the advantage of the colander/bowl set of the present invention is that the same water in the bowl can be used to wash as much produce as desired and most importantly, without having to run and waste water from a faucet. Unfortunately, when most people use a separate, stand-alone colander to clean produce they continuously run water from the faucet, thereby potentially wasting gallons of water.

Further, water collected in the bowl of the colander/bowl set can be used for a variety of other purposes, for example to water plants, thereby resulting in an additional savings of water. Water is one of the most precious commodities on Earth—saving it can come easily.

Integrating a colander with a bowl according to the present invention also helps prevent produce from becoming soggy. The user of the colander/bowl set can take the colander out of the bowl and let excess water drain from the bottom and sides of the colander. The produce can then be taken from the colander and be used for cutting, cooking, or eating.

For all of us who care about the environment and would like to lead a more eco-friendly life, this kitchen device is one small way to make a big difference in the amount of water we use to wash, drain, or soak food. As people have started to embrace all things green, the combination colander/bowl set will instantly be a favorite household utensil for water-saving or "going green".

In sum, the colander/bowl set of at least one embodiment of the present invention is all about saving at least one of the following:

(1) Saving water by not having to continuously run water from a faucet when washing food;

(2) Helping preserve the freshness of produce by washing it with the colander/bowl set and preventing soggy produce;

(3) Saving time in the kitchen by having an integrated, combined colander/bowl set. One utensil makes the entire process easier and quicker;

(4) Saving money and the environment, by potentially saving gallons of water every time food is washed, cleaned, drained or soaked; or (5) Saving kitchen utensils as the bowl from the set can also be used as a preparation, serving or mixing bowl; there's no need to buy additional bowls for this purpose.

The colander/bowl set of at least one embodiment of the present invention reduces the mess when pouring the rinse water from the bowl via the spout, minimizing spilling of water, and provides handles on both sides of the bowl for easy picking up the bowl and control of pouring of the rinse water.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A colander/bowl set, comprising:
a bowl comprising:
grooves located on handles of the bowl,
a spout,
at least one marker corresponding to a volume of water in the bowl, and
at least one indicator located on an inside of the bowl; and
a colander comprising a plurality of holes, said colander being insertable into the bowl and having handles removably attachable into the grooves of the bowl;
wherein the at least one indicator comprises a calibrated guide positioned at a height of a maximum amount of water which the bowl holds accounting for displacement of water by the colander and by a particular kind of food and a specific amount of food;
wherein the particular kind and amount of food is engraved, stamped, or embossed on at least one of the bowl or colander.

2. A colander/bowl set according to claim 1, wherein the at least one indicator comprises least one of a groove, channel, indentation, protrusion, rib, line, or any combination thereof.

3. A colander/bowl set according to claim 1, wherein the at least one indicator comprises a line around an inside of the bowl.

4. A colander/bowl set according to claim 1, comprising two or more indicators, wherein each indicator is a calibrated guide positioned at a height for a maximum amount of water which the bowl holds, accounting for displacement of water by the colander and by the respective food.

5. A colander/bowl set according to claim 1, wherein the at least one indicator is a potato calibrated guide.

6. A colander/bowl set according to claim 1, wherein the at least one indicator is an apple calibrated guide.

7. A colander/bowl set according to claim 1, wherein the bowl further comprises a raised lip or indented trough on an inside bottom surface thereof into which the colander may be removably attached.

8. A colander/bowl set according to claim 7, wherein the colander comprises a pedestal which engages the raised lip or indented trough.

9. A colander/bowl set according to claim 1, wherein the bowl and colander comprise a bisphenol-A free plastic material.

10. A colander/bowl set according to claim 1, wherein said at least one indicator comprises a guide for food having less water displacement than that used for calibration.

11. A colander/bowl set, comprising:
a bowl comprising:
grooves located on handles of the bowl,
at least one indicator located on an inside of the bowl and positioned at a height of a maximum amount of water which the bowl holds calibrated for displacement of water by the colander and by a particular kind and specific amount of food; and
a plurality of markers corresponding to a volume of water in the bowl and located beneath the at least one indicator, and
a colander comprising a plurality of holes, said colander being insertable into the bowl and having handles removably attachable into the grooves of the bowl,
wherein the particular kind and amount of food is engraved, stamped, or embossed on at least one of the bowl or colander.

* * * * *